(12) United States Patent
Maxit et al.

(10) Patent No.: US 6,601,461 B2
(45) Date of Patent: Aug. 5, 2003

(54) MULTI-PHASE COMPENSATED SPINNER FLOW METER

(75) Inventors: Jorge O. Maxit, Houston, TX (US); David Chace, Richmond, TX (US); Jianrong Wang, Sugar Land, TX (US); Daniel Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/906,344

(22) Filed: Jul. 16, 2001

(65) Prior Publication Data

US 2003/0010135 A1 Jan. 16, 2003

(51) Int. Cl.[7] ............................ G01F 1/05; E21B 49/00
(52) U.S. Cl. ............................ 73/861.79; 73/152.06; 73/152.18
(58) Field of Search .................. 73/152.02, 152.18, 73/152.29, 152.06, 152.52, 152.42, 861.77, 861.78, 861.83; 175/48

(56) References Cited

U.S. PATENT DOCUMENTS

| 4,441,361 A | | 4/1984 | Carlson et al. ........... 73/155.31 |
| 4,441,362 A | | 4/1984 | Carlson .................... 73/155.31 |
| 5,251,479 A | * | 10/1993 | Siegfried et al. ......... 73/152.29 |
| 5,463,903 A | | 11/1995 | Delatorre ................. 73/861.02 |
| 5,551,287 A | * | 9/1996 | Maute et al. ............. 73/152.02 |
| 5,736,637 A | | 4/1998 | Evans et al. .............. 73/152.31 |

* cited by examiner

*Primary Examiner*—Harshad Patel
(74) *Attorney, Agent, or Firm*—Madan, Mossman & Sriram, P.C.

(57) ABSTRACT

A compensated flow measuring system for measuring a multi-phase fluid flow in a well. An impeller intercepts a downhole multi-phase flow. Capacitance and conductivity sensors are mounted in close proximity to the impeller and provide a measure of electrical admittance of the fluid. In one embodiment, the capacitance and conductivity sensors are mounted in at least one single probe mounted near the impeller. An electronics system contains a phase detector for separating the capacitive and conductive signals and providing a signal related to a compensated multiphase flow rate.

15 Claims, 8 Drawing Sheets

MULTI-PHASE COMPENSATED SPINNER FLOW METER

BACKGROUND OF THE INVENTION

1. Field of the Invention

The present invention relates to the evaluation of formation fluids produced into a wellbore. More particularly, the present invention relates to a system that combines multiple sensors in a single downhole module for compensated multiphase flow evaluation.

2. Description of the Related Art

In petroleum producing wells it is not uncommon to find the well fluid flow regime consisting of multiple phases, such as oil and water, oil and gas, or oil, water and gas. Often, one or more of these phases is an undesired element in the well production flow. For example, in the case of a well fluid flow regime consisting of oil and water, the oil is typically the fluid phase desired to be produced and the water is typically an undesired phase in the production flow. When the degree of water present in the well production flow becomes excessive, logging surveys are run at a plurality of depth locations within the well to facilitate the determining of the flow rates of the individual phases at each of the locations. From these flow rate determinations, which will yield information regarding the depth locations and rates of water entry, remedial actions to control such water entry may be chosen.

A spinner (or impeller) type flowmeter is typically used to measure flow velocity from which an overall flow rate is determined. The impeller rotates as it is impinged by the downhole flow. As is known in the art, the impeller angular rotation speed (typically in revolutions per second) is related to the product of the fluid density and the fluid velocity, where the fluid velocity is further used to determine flow rate. Each fluid type has a unique slope, also known as a conversion factor, which is related to the fluid density. In addition, due to bearing friction, each type of fluid has a unique velocity required to initiate impeller motion. At any given impeller speed, multiple fluid velocities are possible depending on which conversion factor is used. Therefore, to determine a flow rate from an impeller angular speed requires knowledge of the fluid density or knowledge of the fluid type from which an appropriate conversion factor can be inferred.

The composition of formation fluids can be identified by certain electrical characteristics. Hydrocarbon fluids have a low conductivity, while salt water brines typically found in subsurface formations have a relatively high conductivity. Because of this fundamental difference in conductivity, downhole sensors can be developed and used to measure the conductivity of the formation fluids. Relative conductivity is evaluated by measuring the amount of current transmitted through the formation fluid sample between two or more electrodes when a selected voltage is applied to them.

In addition to conductivity characteristics, most fluids have a specific dielectric permittivity that can be used to identify them. Dielectric permittivity sensors are usually constructed as a capacitor and measure changes in the capacitor's dielectric.

In some prior art tool combinations, a fluid typing sensor has been located above, below, or to the side of the spinner element. By not sensing the fluid type of the same fluid that is intercepted by the spinning element, errors have been introduced due to the inhomogeneities of the multi-phase fluid. Accordingly, a need exists for an improved downhole system that can accurately and efficiently evaluate the flow of multi-phase formation fluids.

The methods and apparatus of the present invention overcome the foregoing disadvantages of the prior art by providing a spinner type flowmeter with fluid typing sensors mounted in close proximity to the impeller, thereby providing a more reliable system for determining the flow rate of multi-phase fluids.

SUMMARY OF THE INVENTION

The present invention contemplates a compensated flow measuring system for measuring a multi-phase fluid flow in a well. The flow measuring system uses a combination of a spinner flowmeter and a fluid typing sensor system in a single measuring device. The close proximity of the fluid typing system to the rotating elements of the flowmeter ensures that the correct fluid type flow conversion factors are utilized for measuring a multi-phase fluid flow.

In a preferred embodiment, the compensated flow measuring system comprises an impeller assembly for intercepting a downhole multi-phase flow and generating an electrical signal related to the indicated flow; a fluid typing system using a conductivity sensor and a capacitance sensor, in close proximity to the impeller, for determining the electrical admittance of the flowing fluid and generating an electric signal related to the fluid type; and, an electronics system for powering the impeller assembly and the fluid typing system and for receiving and analyzing the signals from the impeller assembly and the fluid typing system and outputting a signal related to a compensated flow rate of the multi-phase fluid.

In one preferred embodiment, the conductivity sensor and the capacitance sensor are combined in a single probe which is mounted on an impeller cage arm. The arm acts as an alternating current transmitter for generating conductive and displacement currents into the fluid. The transmitted signal is at a preferred frequency of about 66 kHz. The currents are sensed by the combined sensors in the single probe. The currents are converted into voltage signals. A phase detector separates the combined conductive and capacitance signals and outputs separate voltages related to the conductive and capacitance currents. A processor analyzes the output voltages and acts according to programmed instructions to generate a signal related to a compensated flow rate.

In another preferred embodiment, the transmitted frequency is in the range from about 40 kHz up to and including about 200 kHz.

The method of the invention is practiced by intercepting a multi-phase flow in a well with an impeller assembly having said impeller assembly output an electrical signal related to the flow rate; determining an electrical characteristic of the fluid, and analyzing the fluid flow and the electrical characteristic to generate a signal related to a compensated multi-phase flow rate.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
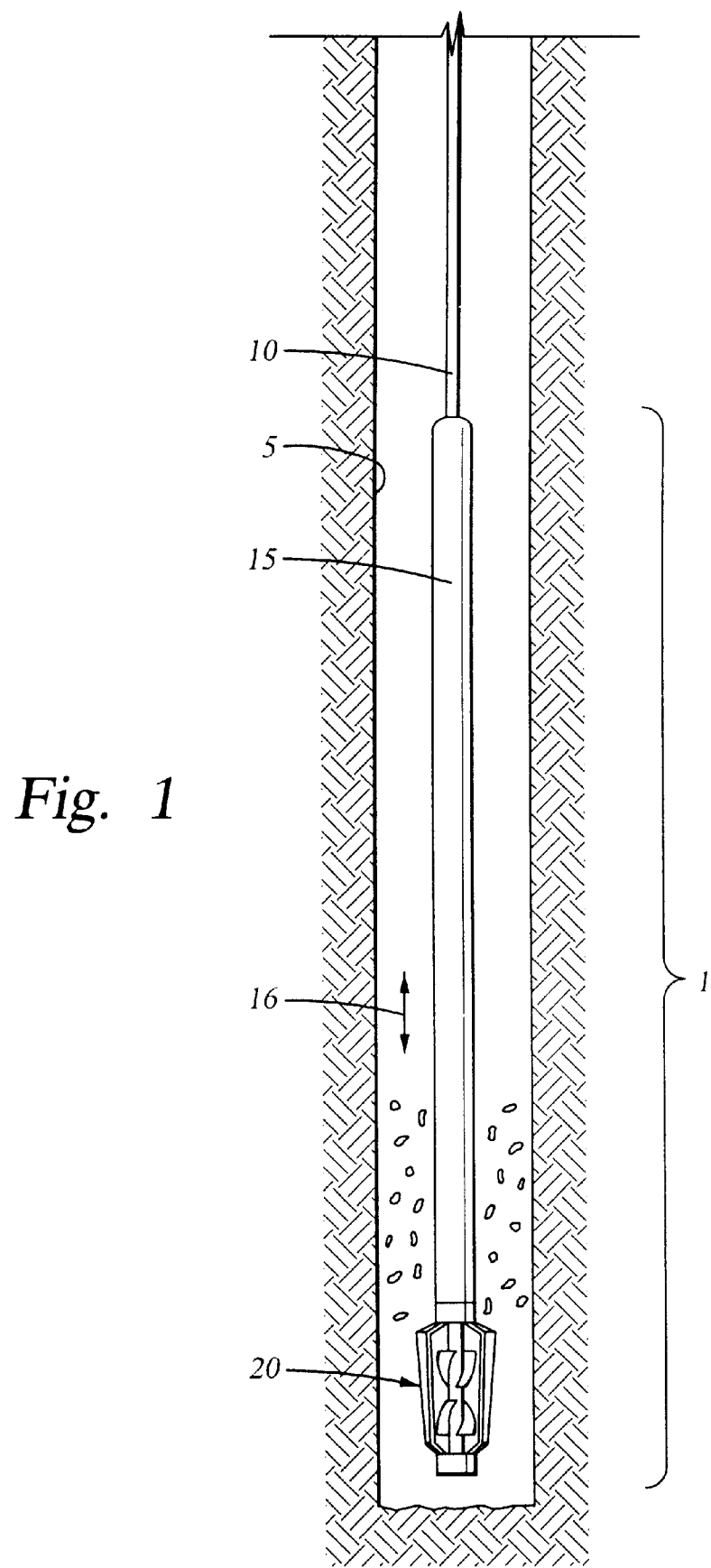
FIG. 1 is a schematic of a flowmeter suspended in a well according to one embodiment of the present invention.

FIG. 1 is a schematic showing of a compensated multiphase flowmeter 1 suspended in a borehole 5 at the end of an electric wireline 10. The wireline 10 runs over pulleys (not shown) at the surface and winds on a surface winch (not shown) allowing the flowmeter 1 to be moved along the borehole 5. The flowmeter 1 is comprised of an electronics module 15 and a sensor module 20 consisting of sensors for characterizing the multi-phase flow in the borehole 5. While the multi-phase flow 16 is typically in the uphole direction, crossflow may occur between different downhole producing layers creating flow in a downhole direction at certain locations. As used herein, multi-phase flow refers to combinations of the physical phases of gas and liquid and to a combination of immiscible fluids such as oil and water, and combinations thereof.

Figure 2:
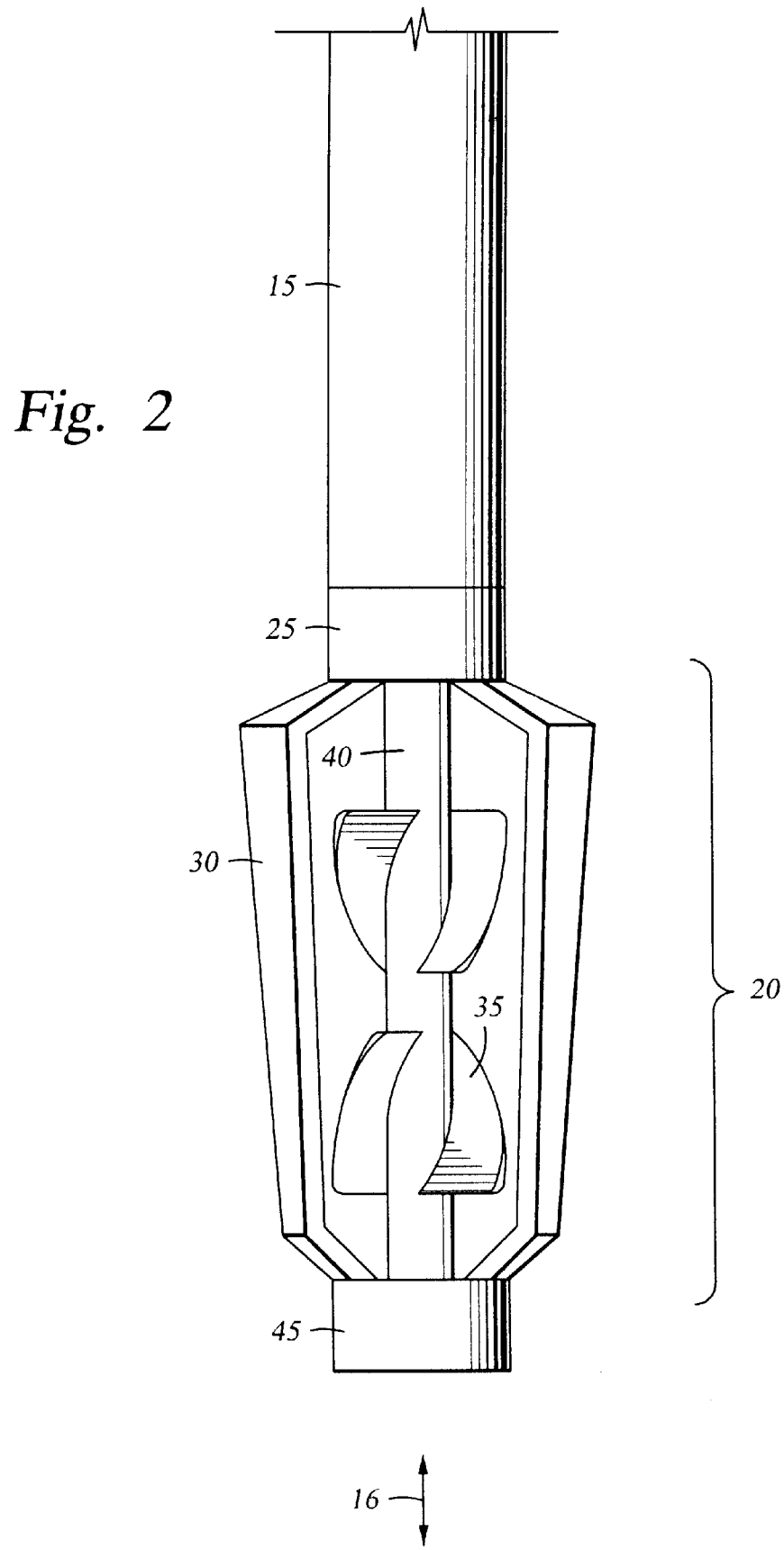
FIG. 2 is a schematic of a downhole sensor assembly according to one embodiment of the present invention.

FIG. 2 is a schematic diagram showing the bottom portion of flowmeter 1. Electronics module 15 is connected to sensor module 20. Sensor module 20 comprises an impeller assembly and fluid typing sensors (see FIGS. 3a, b) for determining the type of fluid flowing through the impeller 35. The impeller 35 is supported and protected by a cage section typically having three cage arms 30 positioned equally around the impeller 35. The cage arms attach to an upper bearing housing 25 at the upper end of the arms 30 and to a lower bearing housing at the lower end of the arms 30. The cage arms contain a fluid typing sensor (see FIGS. 3a, b). The impeller 35 is attached to a shaft 40 which is supported by thrust and radial bearings (not shown) in the upper bearing housing 25 and the lower bearing housing 45. The impeller 35 is free to rotate within the bearings when impinged by fluid flowing in either direction. The impeller 35 has curved surfaces which cause a directional change in fluid momentum as the flow impinges on the impeller 35. The impeller 35 and its associated cage arms 30 may be sized to intercept either a portion or essentially all of the multi-phase fluid flow.

The impeller shaft 40 rotation is determined by sensors (not shown) mounted in the upper bearing housing 25 which are used to determine both the rotation rate and direction of rotation of the shaft 40. These sensors are typically proximity type sensors, common in the art, and are not described further. The output of the rotation sensors is sensed and analyzed by circuitry in the electronics module 15. Electronics module 15 contains an electronics system of electronic circuits and processors for powering and analyzing, according to programmed instructions, the outputs from the downhole sensors associated with the sensor module 20. The electronics module 15 outputs the analyzed signal to a surface unit (not shown) for further processing and/or use by the operator. Alternatively, the electronics module 15 may contain only power and sensor interfacing circuits which provide suitable raw sensor signals for transmission to a surface unit (not shown) for processing into compensated flow related signals.

Fluid typing is achieved by measuring the electrical properties of the fluids. In general they measure the admittance of the fluid mixture to the passage of alternating currents. The electrical admittance has a real and an imaginary part. The real part of the electrical admittance lets electric currents pass within the fluid mixture, in phase with the impressed voltage. The imaginary part of the electrical admittance lets electric currents pass within the fluid in quadrature, or out of phase, in reference to the impressed voltage. Conductivity sensors are used to measure the real part of the electrical admittance, while capacitive sensors are generally used to measure the imaginary part of the electrical admittance.

Figure 3A:
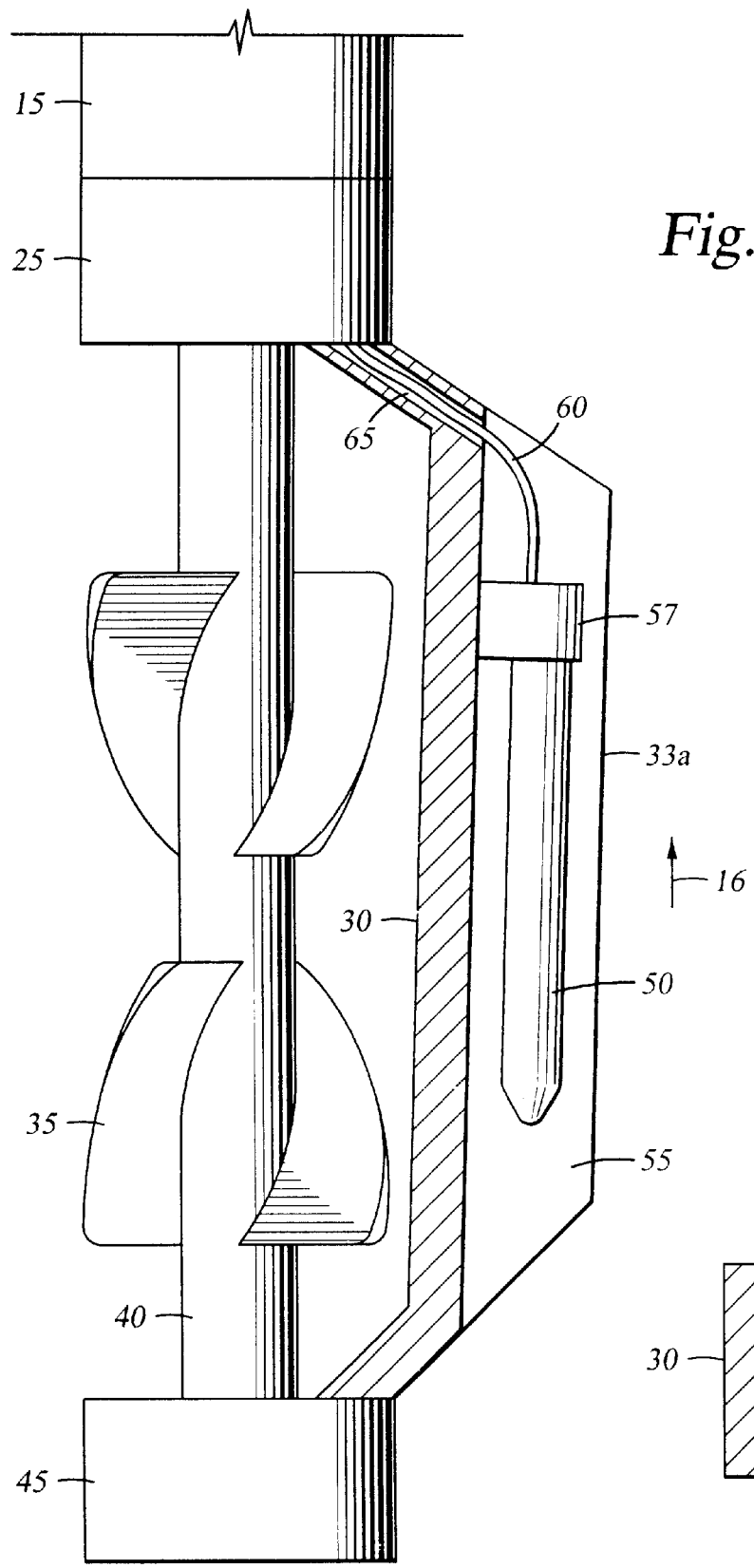
FIGS. 3a–b are schematics of a section of an impeller assembly according to one embodiment of the present invention.
Figure 3B:
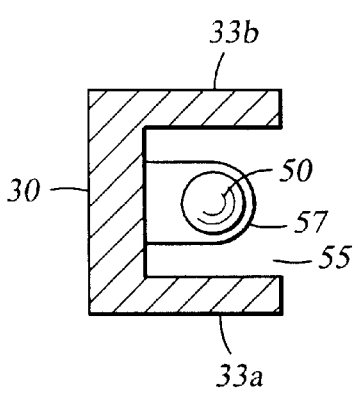

FIGS. 3a, b show a cross-section of a cage arm 30 with an electrical admittance sensor which comprises a probe 50 and transmitter plates 33a, b which are portions of a slot fabricated in arm 30. The electrical admittance sensor has both a conductivity sensor and a capacitance sensor and measures both conductive and displacement currents between transmitter plates 33a, b and probe 50. The probe 50 is electrically isolated from arm 30 by insulator 57. A coax type cable 60 is attached to probe 50, as will be described later, and cable 60 is run through hole 65 and is sealingly attached to electronics module 15. Each arm 30 may be adapted to include a fluid typing sensor. It will be appreciated that the probe 50 may alternatively be mounted on the inside of arm 30 facing the impeller 35.

Figure 4:
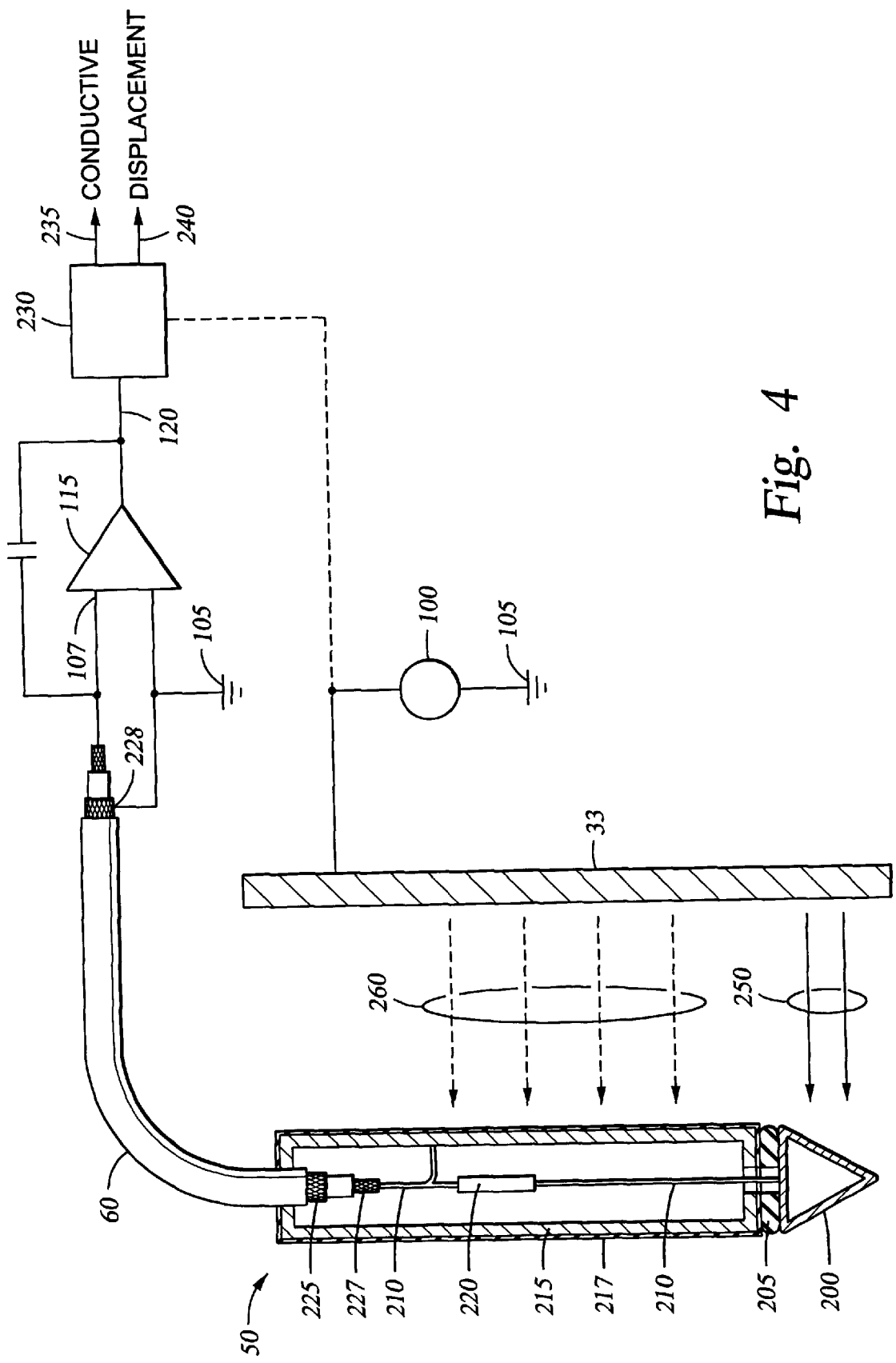
FIG. 4 is a schematic of an electric diagram of a combined conductivity sensor and a capacitance sensor according to one embodiment of the present invention.

FIG. 4 shows a detail of the inside of the probe 50, and the electrical circuitry capable of detecting and separating output voltages into components that are related to the displacement currents 260 and the conductive currents 250. AC transmitter 100 impresses a voltage on transmitter plate 33 in reference to analog ground 105. Displacement currents 260 find a path by sinking back to analog ground 105 through the cylindrically shaped probe 50, which consists of a metal tube 215 covered by a thin layer of insulating material 217, such as vapor deposited quartz. The metal cylinder 215, its thin insulating layer 217, and the surrounding fluid forms a capacitor. Displacement currents 260 can flow through this thin insulating layer 217, while galvanic currents 250 are prevented from passing through the insulator 217. The tube 215 is electrically connected to the conductive wire 210 downstream of resistor 220, causing the signal to travel in the coaxial cable center conductor 227 to the input 107 of the charge amplifier 115.

Conductive, also called galvanic, currents 250 can only flow via the tip 200 of the probe 50, which comprises an exposed metal cone connected to the same center conductor of the coaxial cable, and then passing through a resistor 220. The resistor 220 prevents the displacement currents 260 from being grounded by the metal tip 200 and the conductive currents 250 and allows both sensors to use a single coaxial conductor 227. Displacement currents 260 collected by the insulated tube can be merged with conductive currents 250 from the probe tip while keeping a phase difference between the currents. The metal cone 200 is electrically isolated from the metal tube 215 by the non-conducting seal 205. Seal 205 also acts to seal out environmental contamination from the metal tube 215.

The coaxial cable inner conductor 227 is used to conduct the in phase and in quadrature currents from the two sensors of the probe 50 into the input of the amplifier 115. The shield 225 of the coax cable 60 is connected on only one end 228, to the amplifier local analog ground 105. The AC transmitter 100 is connected to the transmitter plates 33a, b and to the phase detector 230. The voltage 120 from the output of the charge amplifier 115 is fed to the phase detector 230 where the voltage's phase is compared to the transmitter voltage's phase. The phase detection may be done with hardware with commercially available modules, or alternatively, it may be done after analog to digital conversion with a software algorithm, as is known in the art.

The phase detector 230 can determine if the currents flowing into the probe 50 are galvanic 250, doing so via the metal tip 200, or if they are displacement currents 260, flowing into the probe via the layer of insulation 217 on the metal cylinder 215. The voltage representing the galvanic currents 250 will be 90 degrees out of phase from the voltages representing the displacement currents 260. The voltages are analyzed and the results are used to indicate and correct for the type of fluid passing through the impeller 35 at any time. The voltages may be processed in the electronics module 15 and transmitted to the surface unit over the wireline 10 or the voltages may be digitized and sent to the surface for processing in the surface unit.

The value of the resistor 220 inside the probe 50, and in series with the conductive metal tip 200, is chosen so that it is approximately equal to the capacitive reactance formed when the capacitive part of the probe is submerged in conductive water, that is Xc=R, with $Xc=1/(2*pi*f*C)$, where pi=3.14, and f is the frequency of the alternating current, and C is the capacitance of the probe. The capacitance C can be determined by measuring it between the coaxial cable center conductor and the probe cage, when the probe and the cage are totally submerged in conductive water, and the path of galvanic currents has been interrupted by disconnecting the resistor 220. The layer of insulation 217 of the metal cylinder 215 will determine the capacitance of the probe, which will be matched with a resistor value of similar reactance at the frequency of operation. Any frequency may be used from about 40 kHz to about 200 kHz, with a preferred value of about 66 kHz.

Figure 5:
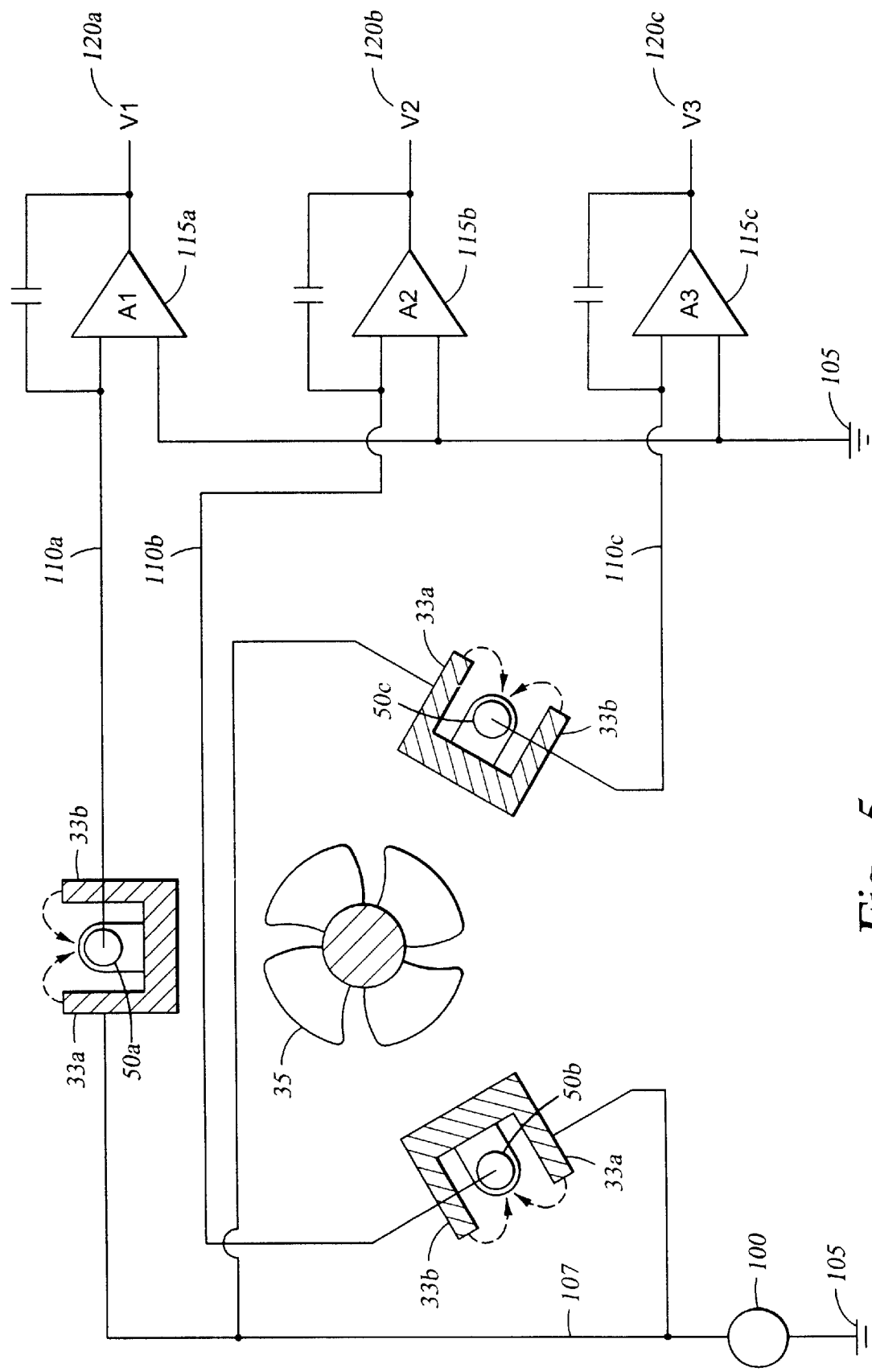
FIG. 5 is a schematic of an electric diagram of an impeller assembly and multiple sensing probes according to one embodiment of the present invention.

FIG. 5 shows a generalized schematic of a three arm fluid typing sensor according to one preferred embodiment of the present invention. Three slot type cage arms, each with transmitter plates 33a, b are adapted with three fluid typing probes 50a–c and the cage arms are mounted around impeller 35. Each of the probes 50a–c is mounted in a slot of each of the arms, respectively. Each of the probes 50a–c is associated with a corresponding set of transmitter plates 33a, b, with both plates 33a, b of each pair being electrically connected together. Transmitter 100 generates an AC signal which is impressed on each set of transmitter plates 33a, b. The transmitter plates transmit both displacement and capacitive currents towards the sensing probes 50a–c.

Currents 110a–c are the currents flowing from the receiving probes 50a–c, and going into the input of charge amplifiers 115a–c, respectively. Voltages 120a–c are the output voltages of the charge amplifiers. The currents 110a–c are a function of the electrical admittance of the fluid, and the output voltages 120a–c are proportional to the input currents 110a–c. As a result, the output voltages are related to the admittance of the fluid flowing between the transmitter plates and sensing probes and near the impeller. The voltages 120a–c are fed to a phase detection circuit which determines the displacement and conductive currents from their phase relationship with the transmitter 100 signal, as previously described.

Figure 6:
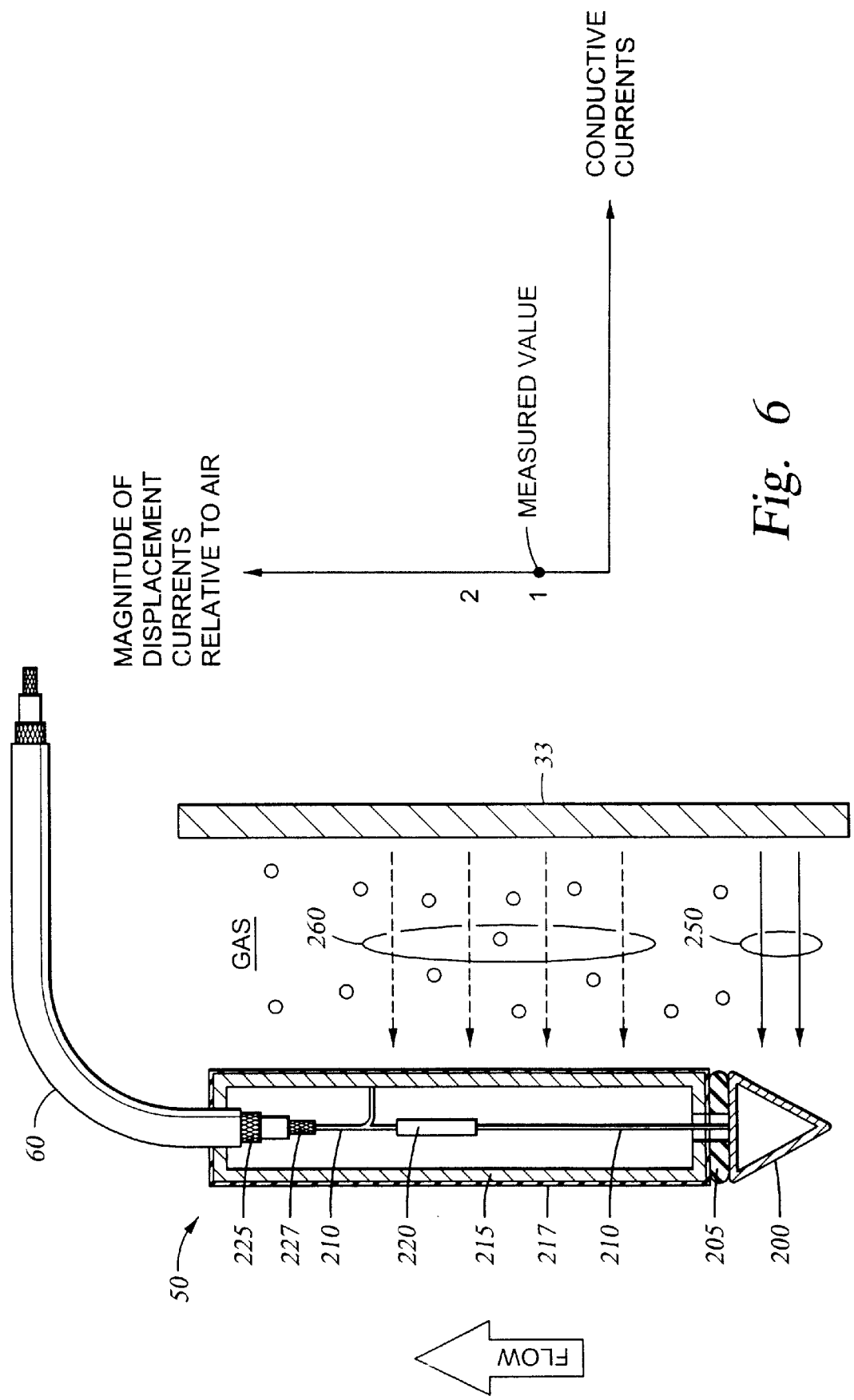
FIG. 6 is a schematic showing a sensing probe response in a gas according to one embodiment of the present invention.
Figure 7:
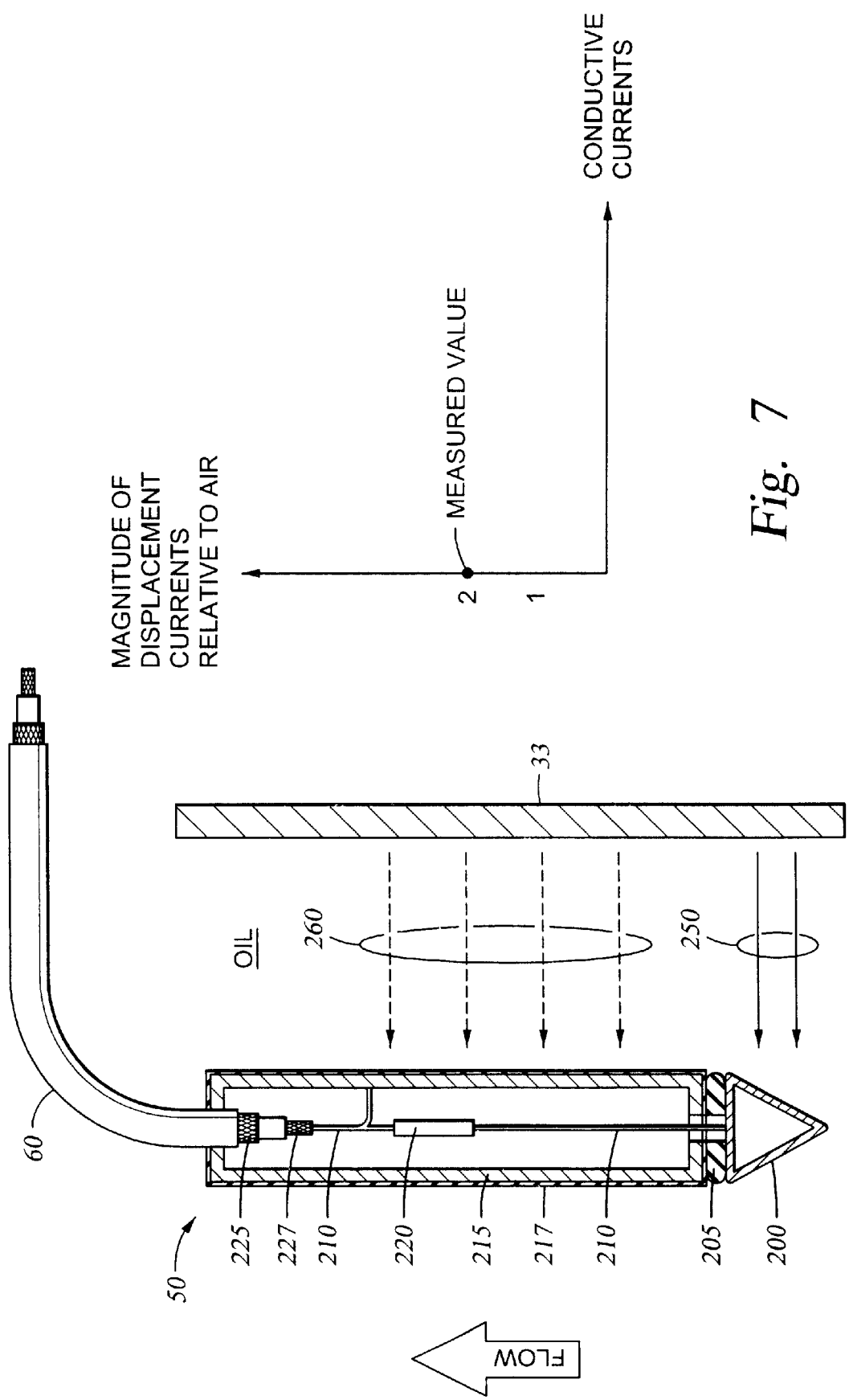
FIG. 7 is a schematic showing a sensing probe response in oil according to one embodiment of the present invention; and, FIG. 8 is a schematic showing a sensing probe response in an oil/gas fluid according to one embodiment of the present invention.
Figure 8:
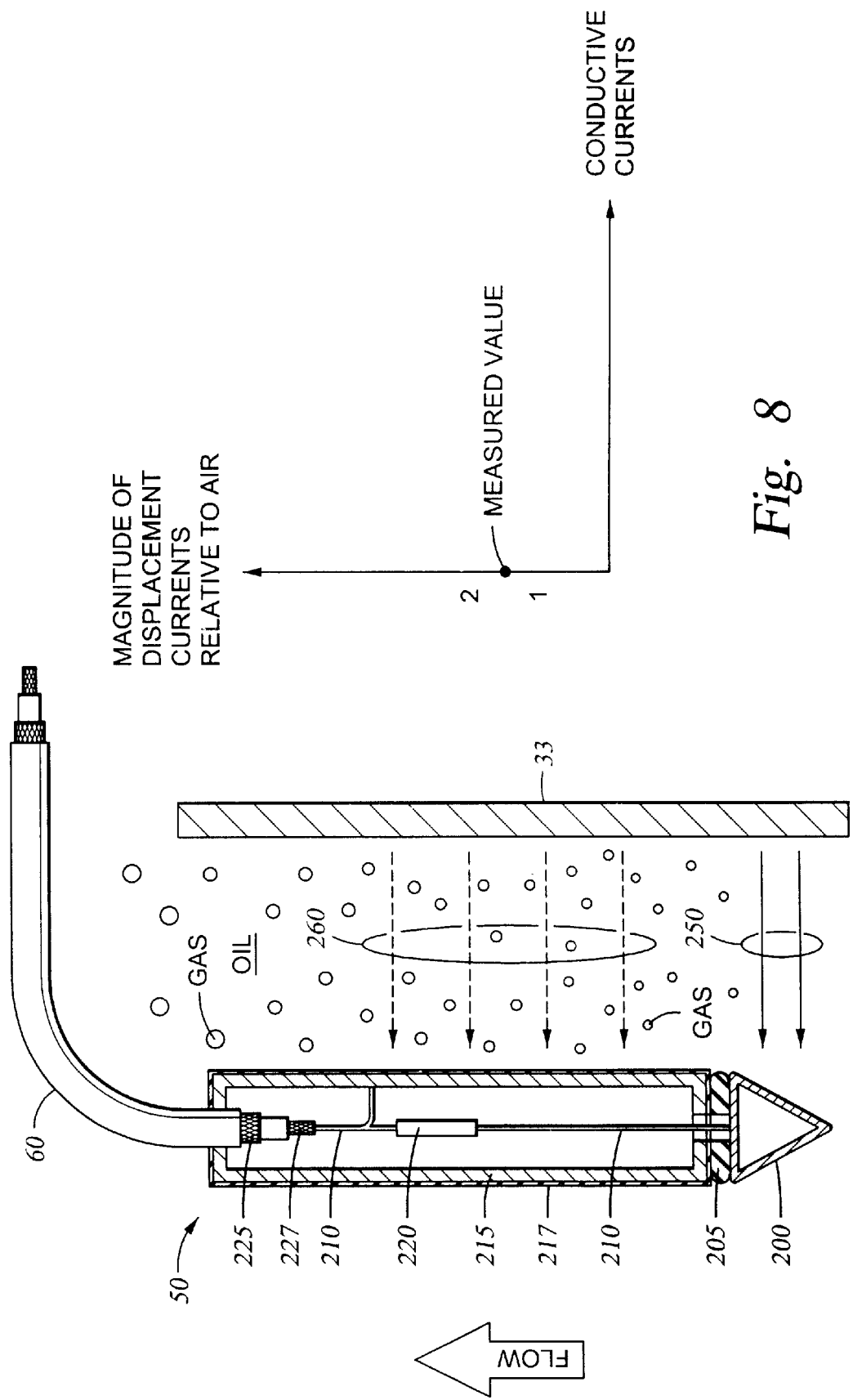

In general, referring to FIGS. 6 and 7, when the probe is totally submerged in air or oil, no galvanic currents 250 are able to find a path to the probe 50. As a result, the phase detector 230 will measure all the current flowing as displacement currents 260 in quadrature with the transmitter voltage. The all oil to all gas ratio of currents is nominally two to one reflecting the known relative permittivity of oil and gas. If mixtures of oil and gas are present, as in FIG. 8, then the resulting displacement currents 260 will fluctuate between the values of gas and those of oil.

When the probe 50 is totally submerged in water, galvanic currents 250 will flow into the probe 50 via the metal tip 200, and because the conductive water is at the same potential of the transmitter plate, it will inject into the capacitive part of the probe 50, displacement currents 260 that will be shifted into quadrature, by the capacitor formed by the conductive fluid, the thin insulation, and the metal tube itself. In this case, the phase detector will determine that both in phase (conductive) and in quadrature (displacement) currents flow into the coaxial center conductor 227.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A compensated flow measuring system for measuring a multi-phase fluid flow in a well, comprising:
   an impeller assembly adapted for intercepting a downhole multi-phase flow, said impeller assembly generating a first signal related to a flow rate of said multi-phase flow, and a second signal related to a flow direction of said multi-phase fluid flow;
   a fluid typing system proximate said impeller assembly for determining an electrical admittance of said flow proximate said impeller assembly and generating a third signal in response thereto; and,
   an electronics system for receiving said first signal and said second signal from said impeller assembly and said third signal from said fluid typing system, said electronics system adapted to analyze said received signals and provide a fourth signal related to a compensated multi-phase flow.

2. The flow measuring system of claim 1, wherein the impeller assembly further comprises;
   an impeller for intercepting the multi-phase fluid flow, said impeller rotating in relation to the fluid flow rate and in relation to the fluid flow direction,
   a plurality of cage arms for supporting and protecting said impeller; and,
   a rotation sensing system for determining a rotation speed and a rotation direction of said impeller and outputting said first signal and said second signal in response thereto.

3. The flow measuring system of claim 2, wherein the fluid typing system comprises at least one capacitance sensor proximate said impeller assembly and at least one conductivity sensor proximate said impeller assembly, said capacitance sensor and said conductivity sensor generating corresponding signals related to the electrical admittance of the fluid proximate said impeller assembly.

4. The flow measuring system of claim 3, wherein said at least one capacitance sensor and said at least one conductivity sensor are configured in at least one single probe located proximate said impeller assembly, said probe adapted to detect an alternating conductive current and an alternating displacement current in said fluid, said alternating conductive current and said alternating displacement current being injected into said fluid by at least one transmitter plate proximate said probe, said at least one transmitter plate energized with an alternating current at a predetermined frequency.

5. The flow measuring system of claim 4, wherein the at least one probe is mounted to, and electrically insulated from, at least one of said plurality of cage arms, said cage arm acting as the at least one transmitter plate for transmitting the alternating conductive current and the alternating displacement current to said corresponding at least one probe.

6. The flow measuring system of claim 5, wherein the electronics system comprises;

an AC transmitter engaged with each of said at least one of said plurality of cage arms, said transmitter generating a signal of predetermined frequency for transmitting the alternating displacement current and the alternating conductive current to said probe, said AC transmitter signal acting as a reference signal;

a charge amplifier for converting the alternating conductive current into a first alternating voltage related to said alternating conductive current, said charge amplifier also converting said alternating displacement current into a second alternating voltage related to said alternating displacement current,;

a phase detector for determining a phase relationship between said AC transmitter signal and said first alternating voltage and a phase relationship between said AC transmitter and said second alternating voltage and generating a signal related to said first voltage phase relationship and a signal related to said second voltage phase relationship; and, a processor for receiving said impeller assembly signals and said fluid typing signals, said processor acting according to programmed instructions, to generate an output signal related to a compensated flow rate.

7. The flow measuring system of claim 6, wherein the predetermined frequency is about 66 kHz.

8. The flow measuring system of claim 6, wherein the predetermined frequency is in the range from about 40 kHz up to and including about 200 kHz.

9. A method for measuring a compensated fluid flow rate of a multi-phase flow in a well, comprising;

intercepting the multi-phase flow in a well with an impeller assembly, said impeller assembly generating a first signal related to said fluid flow rate and a second signal related to said fluid flow direction;

measuring an electrical admittance of said fluid flow using a fluid typing sensor system located proximate said impeller assembly, said fluid typing system generating a third signal related to said electrical admittance of said fluid; and, analyzing said impeller assembly first signal and said second signal and said fluid typing system third signal and generating an output signal related to a compensated multi-phase fluid flow rate.

10. The method of claim 9, wherein the measuring of the fluid electrical admittance includes determining a fluid conductance and a fluid capacitance.

11. The method of claim 10, wherein determining the fluid conductance and the fluid capacitance includes combining at least one conductivity sensor and at least one capacitance sensor in at least one single probe, mounting said probe proximate said impeller assembly, said probe adapted for detecting an alternating conductive current and an alternating displacement current in said fluid, injecting said alternating conductive current and said alternating displacement current into said fluid by a transmitter plate proximate said probe, said transmitter plate transmitting the alternating conductive current and the alternating displacement current at a predetermined frequency.

12. The method of claim 11, wherein determining the fluid conductance and the fluid capacitance includes mounting at least one probe to, and electrically insulating said probe from, at least one of said plurality of cage arms, said cage arm acting as the transmitter plate for transmitting the alternating conductive current and the alternating displacement current to said probe.

13. The method of claim 11, wherein the transmitting at a predetermined frequency includes transmitting at about 66 kHz.

14. The method of claim 11, wherein the transmitting at a predetermined frequency includes transmitting in the range from about 40 kHz up to and including about 200 kHz.

15. The method of claim 9, wherein intercepting said flow with an impeller assembly includes supporting an impeller with a plurality of cage arms.

* * * * *